(12) United States Patent
Karpuram (10) Patent No.: US 9,588,861 B2
(45) Date of Patent: Mar. 7, 2017

(54) METHOD AND APPARATUS FOR AUTOMATICALLY IDENTIFYING COMPONENTS TO MONITOR IN AN ENTERPRISE ENVIRONMENT

(75) Inventor: Venkata Ramana Karpuram, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1907 days.

(21) Appl. No.: 11/970,930

(22) Filed: Jan. 8, 2008

(65) Prior Publication Data
US 2009/0177696 A1 Jul. 9, 2009

(51) Int. Cl.
*G06F 17/30* (2006.01)
*G06F 11/30* (2006.01)

(52) U.S. Cl.
CPC .................................. *G06F 11/30* (2013.01)

(58) Field of Classification Search
CPC ......... G06F 17/30088; G06F 17/30867; G06F 17/30958
USPC ............................. 717/151, 174; 707/104.1
See application file for complete search history.

(56) References Cited

U.S. PATENT DOCUMENTS

| | | | |
|---|---|---|---|
| 7,464,147 B1* | 12/2008 | Fakhouri et al. | 709/223 |
| 7,554,959 B1* | 6/2009 | Dowling | 370/338 |
| 7,616,583 B1* | 11/2009 | Power et al. | 370/252 |
| 7,664,756 B1* | 2/2010 | Felton | G06Q 10/06 370/254 |
| 7,716,660 B2* | 5/2010 | Mackay | 717/173 |
| 2002/0144248 A1* | 10/2002 | Forbes et al. | 717/167 |
| 2002/0166117 A1* | 11/2002 | Abrams et al. | 717/177 |
| 2004/0015953 A1* | 1/2004 | Vincent | 717/173 |
| 2004/0221267 A1* | 11/2004 | Chase et al. | 717/121 |
| 2006/0085530 A1* | 4/2006 | Garrett | G06F 11/3495 709/223 |
| 2006/0241961 A1* | 10/2006 | Tsyganskiy et al. | 705/1 |
| 2007/0169049 A1* | 7/2007 | Gingell et al. | 717/151 |
| 2011/0131330 A1* | 6/2011 | Beaty et al. | 709/227 |

OTHER PUBLICATIONS

"Automated Anomaly Detection and Performance Modeling of Enterprise Applications"—Cherkasova et al, ACM TOCS, Feb. 2008 http://www.labs.hpe.com/people/lucy_cherkasova/papers/ace-tocs.pdf.*

* cited by examiner

*Primary Examiner* — Randy Scott
(74) *Attorney, Agent, or Firm* — Shun Yao; Park, Vaughan, Fleming & Dowler, LLP (57) ABSTRACT

One embodiment of the present invention provides a system that facilitates automatically identifying components to monitor in an enterprise environment. During operation, the system receives a designation of the enterprise environment. The system then identifies an enterprise application in the enterprise environment. The system also scans the enterprise application for one or more software components, wherein a software component can include a service, a database, or any other object that provides functionality to the enterprise application. The system then adds each software component to a monitor list. Next, the system determines each hardware component hosting the enterprise application and the software components. The system then adds each hardware component to the monitor list. Finally, the system stores the monitor list to facilitate subsequent monitoring of the enterprise application.

18 Claims, 7 Drawing Sheets

METHOD AND APPARATUS FOR AUTOMATICALLY IDENTIFYING COMPONENTS TO MONITOR IN AN ENTERPRISE ENVIRONMENT

BACKGROUND

Field of the Invention

The present invention relates to enterprise computing systems. More specifically, the present invention relates to a method and an apparatus for automatically identifying components to monitor in an enterprise environment.

Related Art

Many organizations rely extensively on enterprise applications to manage and store critical information. Often, these applications are distributed across multiple servers, databases, and appliances. This distributed framework provides for greater flexibility, performance, and redundancy, but at the same time increases the complexity of monitoring the entire system to avoid costly downtime.

In order to monitor distributed enterprise applications, organizations often use sophisticated monitoring systems that query the status of each individual piece of these applications. However, in order to do so, these monitoring systems require extensive configuration specifying each piece of the distributed enterprise application that needs to be monitored. In many cases, the administrator that is responsible for configuring the monitoring system and performing the monitoring duties is not as intimately aware of all of the pieces of these applications as the application programmers. Thus, it is easy for some critical pieces of these applications to be overlooked as the monitoring system is configured.

In many organizations, distributed enterprise applications are constantly evolving. Software upgrades and patches are regularly applied, hardware is regularly upgraded, and different software modules are regularly added and removed. Many times, these changes are not communicated back to the administrator that is responsible for monitoring these applications, and the monitoring system is not updated to reflect these changes.

Hence, what is needed is a method for monitoring distributed enterprise applications without the problems described above.

SUMMARY

One embodiment of the present invention provides a system that facilitates automatically identifying components to monitor in an enterprise environment. During operation, the system receives a designation of the enterprise environment. The system then identifies an enterprise application in the enterprise environment. The system also scans the enterprise application for one or more software components, wherein a software component can include a service, a database, or any other object that provides functionality to the enterprise application. The system then adds each software component to a monitor list. Next, the system determines each hardware component hosting the enterprise application and the software components. The system then adds each hardware component to the monitor list. Finally, the system stores the monitor list to facilitate subsequent monitoring of the enterprise application.

In some embodiments of the present invention, the system retrieves the monitor list. Next, the system determines each software component and each hardware component hosting the enterprise application and the software components. The system then adds each software component and each hardware component not already on the monitor list to the monitor list. The system also removes each software component and each hardware component from the monitor list that is no longer a part of the enterprise application. Finally, the system stores the monitor list and a change history of the monitor list.

In some embodiments of the present invention, the system retrieves the monitor list. The system also receives a modification to the monitor list from a user. Next, the system applies the modification to the monitor list. Finally, the system stores the monitor list and a change history of the monitor list.

In some embodiments of the present invention, for each hardware component, the system determines if the hardware component is a member of a hardware cluster. If so, the system adds the hardware cluster to the monitor list instead of the hardware component.

In some embodiments of the present invention, for each hardware component, the system determines if the hardware component is a member of a hardware cluster. If so, the system adds each hardware component of the hardware cluster to the monitor list.

In some embodiments of the present invention, for each software component, the system determines if the software component is a member of a software cluster. If so, the system adds the software cluster to the monitor list instead of the software component.

In some embodiments of the present invention, for each software component, the system determines if the software component is a member of a software cluster. If so, the system adds each software component of the software cluster to the monitor list.

In some embodiments of the present invention, scanning the enterprise application for one or more software components involves scanning an Objected-Oriented Programming Language (OOPL) container.

In some embodiments of the present invention, the system periodically updates the monitor list to reflect changes to the enterprise environment.

In some embodiments of the present invention, the system receives a command from a user to update the monitor list. In response to the command, the system updates the monitor list to reflect changes to the enterprise environment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates automatically identifying components to monitor in an enterprise environment. During operation, the system receives a designation of the enterprise environment. The system then identifies an enterprise application in the enterprise environment. The system also scans the enterprise application for one or more software components, wherein a software component can include a service, a database, or any other object that provides functionality to the enterprise application. The system then adds each software component to a monitor list. Next, the system determines each hardware component hosting the enterprise application and the software components. The system then adds each hardware component to the monitor list. Finally, the system stores the monitor list to facilitate subsequent monitoring of the enterprise application.

Note that this process takes place without the aid of an administrator or a user. In the past, an administrator would have to build the list of components to monitor. Embodiments of the present invention accomplish this task automatically by scanning the software and exploring all of the connectivites of the software.

In some embodiments of the present invention, the system retrieves the monitor list. Next, the system determines each software component and each hardware component hosting the enterprise application and the software components. The system then adds each software component and each hardware component not already on the monitor list to the monitor list. The system also removes each software component and each hardware component from the monitor list that is no longer a part of the enterprise application. Finally, the system stores the monitor list a change history of the monitor list.

Note that the system may update the monitor list at any time. Updates could happen on a nightly basis, a weekly basis, or even in real or quasi-real time. In some embodiments of the present invention, the system performs an update of the monitor list every time the system performs a monitoring task for components on the monitor list.

In some embodiments of the present invention, the system retrieves the monitor list. The system also receives a modification to the monitor list from a user. Next, the system applies the modification to the monitor list. Finally, the system stores the monitor list and a change history of the monitor list.

Many occasions exist where a user or an administrator may not want to monitor some of the components detected by the system. For example, a specific component may only be attached to the network once a month for a specific job, and it may be undesirable for the system to constantly report a failure of the component when the component is not attached. Alternatively, sometimes it may be beneficial for a user to report the existence of a required component. In the case where a component is added to the system and the next update of the monitoring system is not scheduled to run for quite some time, it may be beneficial for a user or an administrator to notify the system of the new component to monitor.

In some embodiments of the present invention, for each hardware component, the system determines if the hardware component is a member of a hardware cluster. If so, the system adds the hardware cluster to the monitor list instead of the hardware component.

In some embodiments of the present invention, for each software component, the system determines if the software component is a member of a software cluster. If so, the system adds the software cluster to the monitor list instead of the software component.

Note that many clustering services and many monitoring systems have extensive cluster-monitoring tools. In these cases, it may be only necessary to identify the cluster itself.

Alternatively, in some embodiments of the present invention, for each hardware component, the system determines if the hardware component is a member of a hardware cluster. If so, the system adds each hardware component of the hardware cluster to the monitor list.

Alternatively, in some embodiments of the present invention, for each software component, the system determines if the software component is a member of a software cluster. If so, the system adds each software component of the software cluster to the monitor list.

Computing Environment

Figure 1:
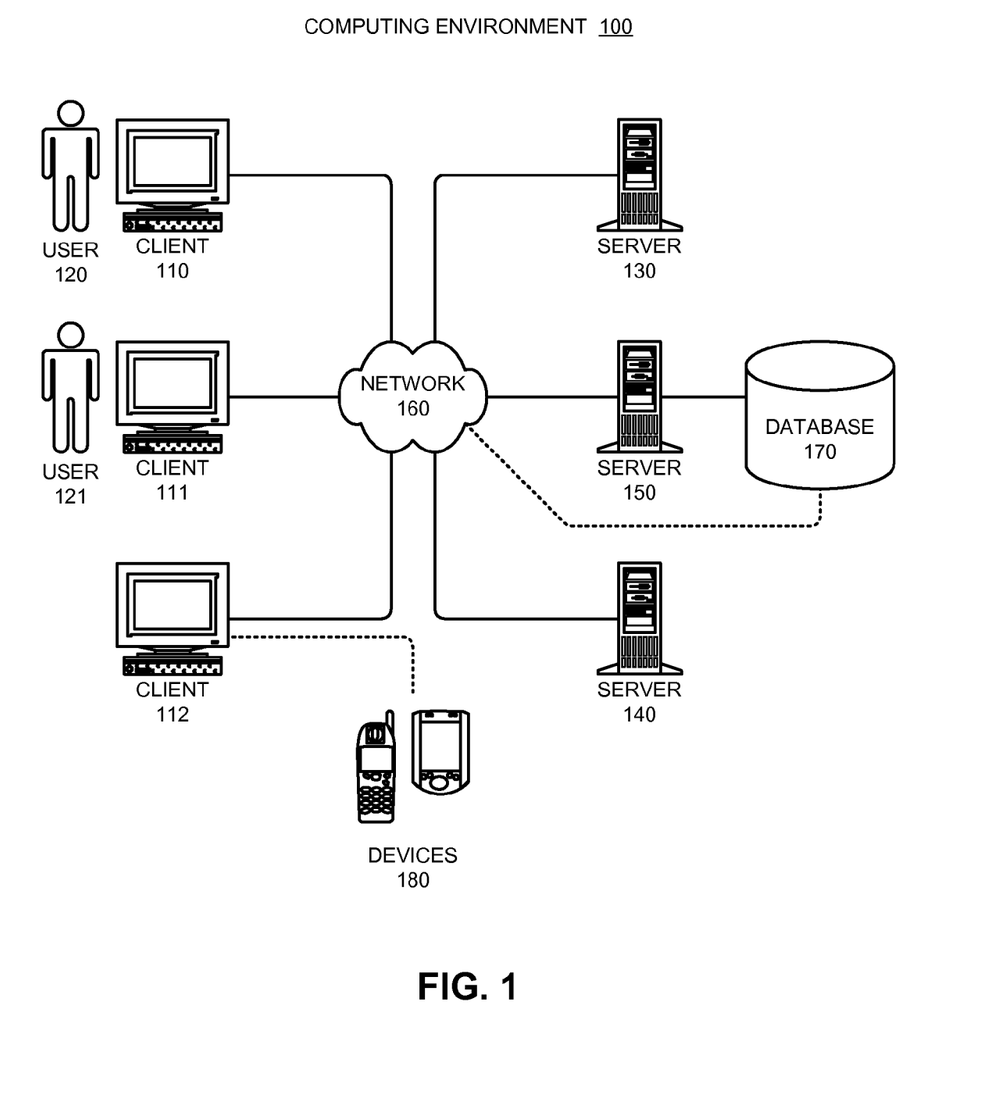
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Note that different embodiments of the present invention may use different configurations, and are not limited to the configuration illustrated in computing environment 100. For example, in one embodiment of the present invention, the enterprise application being monitored is hosted entirely on server 130, while in another embodiment the enterprise application comprises server 130, server 140, server 150, and database 170.

Enterprise Environment

Figure 2:
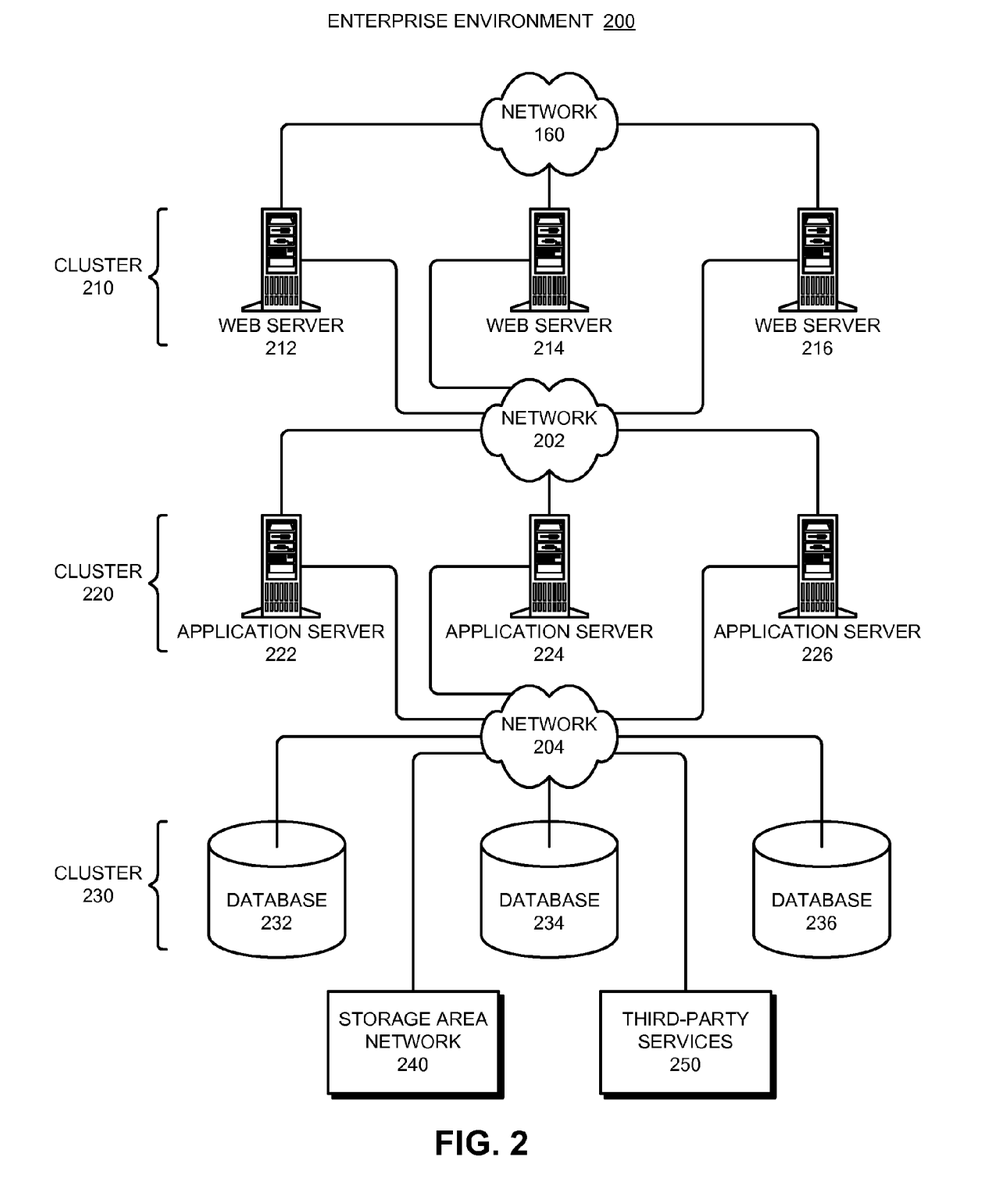
FIG. 2 illustrates an enterprise environment in accordance with an embodiment of the present invention.
Figure 3A:
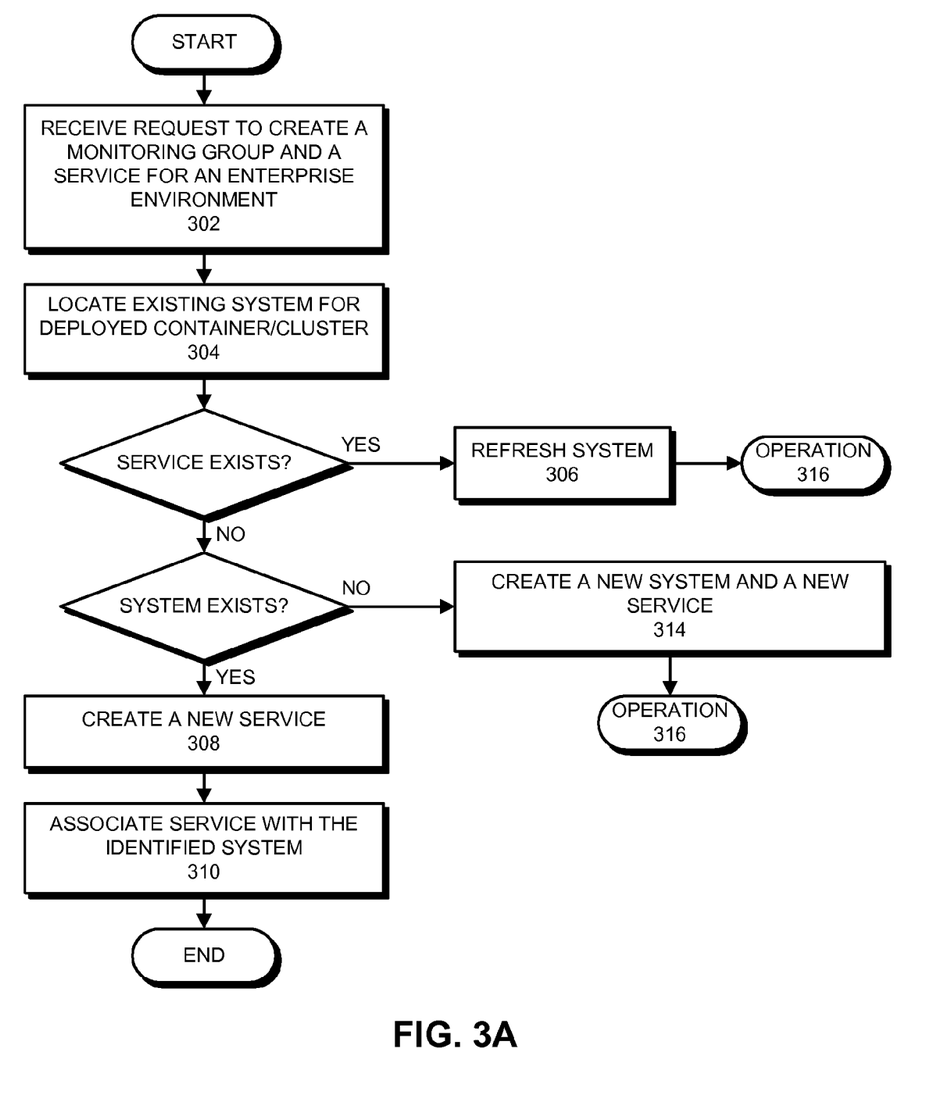
FIGS. 3A-3E present flowcharts illustrating the process of creating and maintaining a monitor list in accordance with an embodiment of the present invention.
Figure 3B:
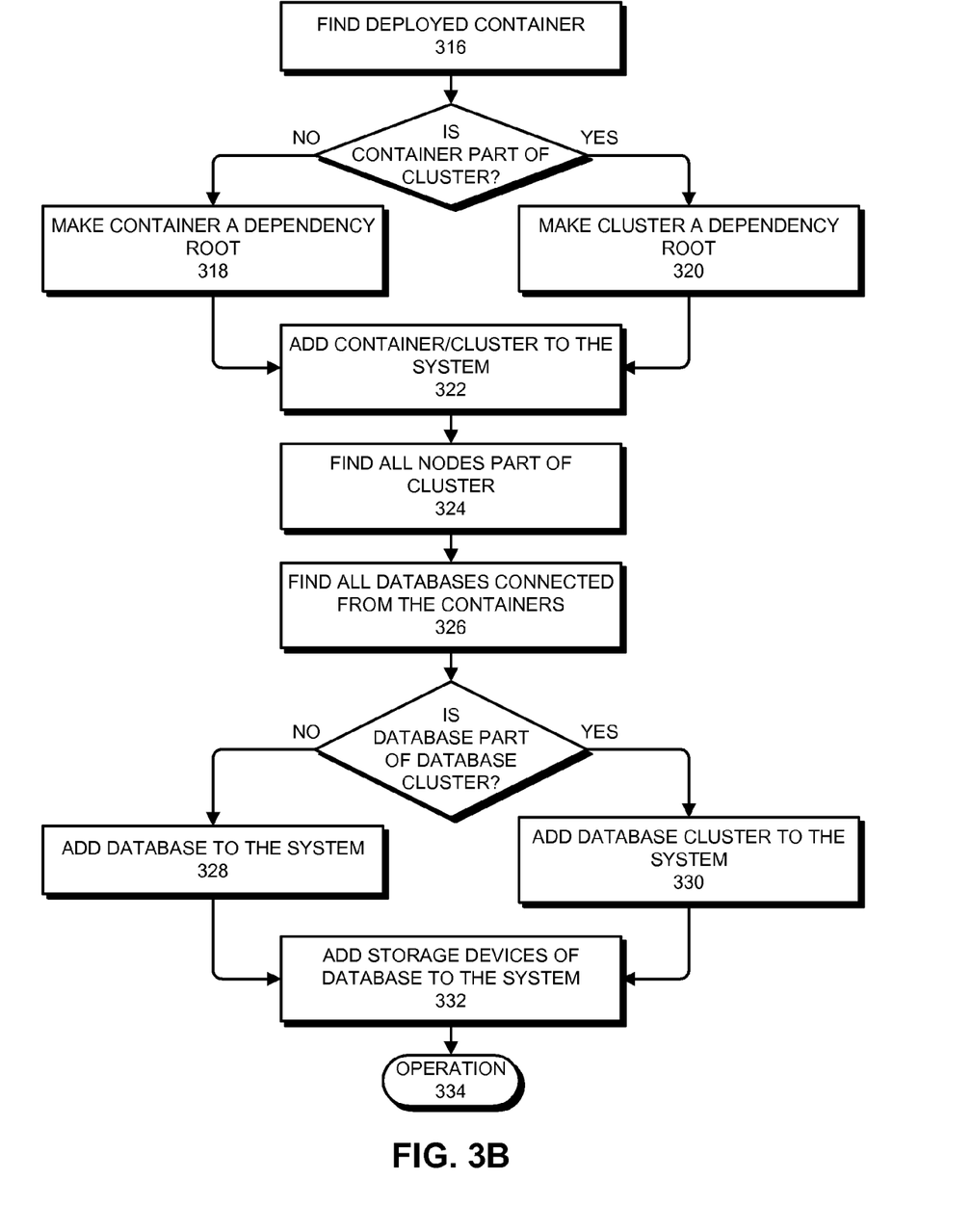
Figure 3C:
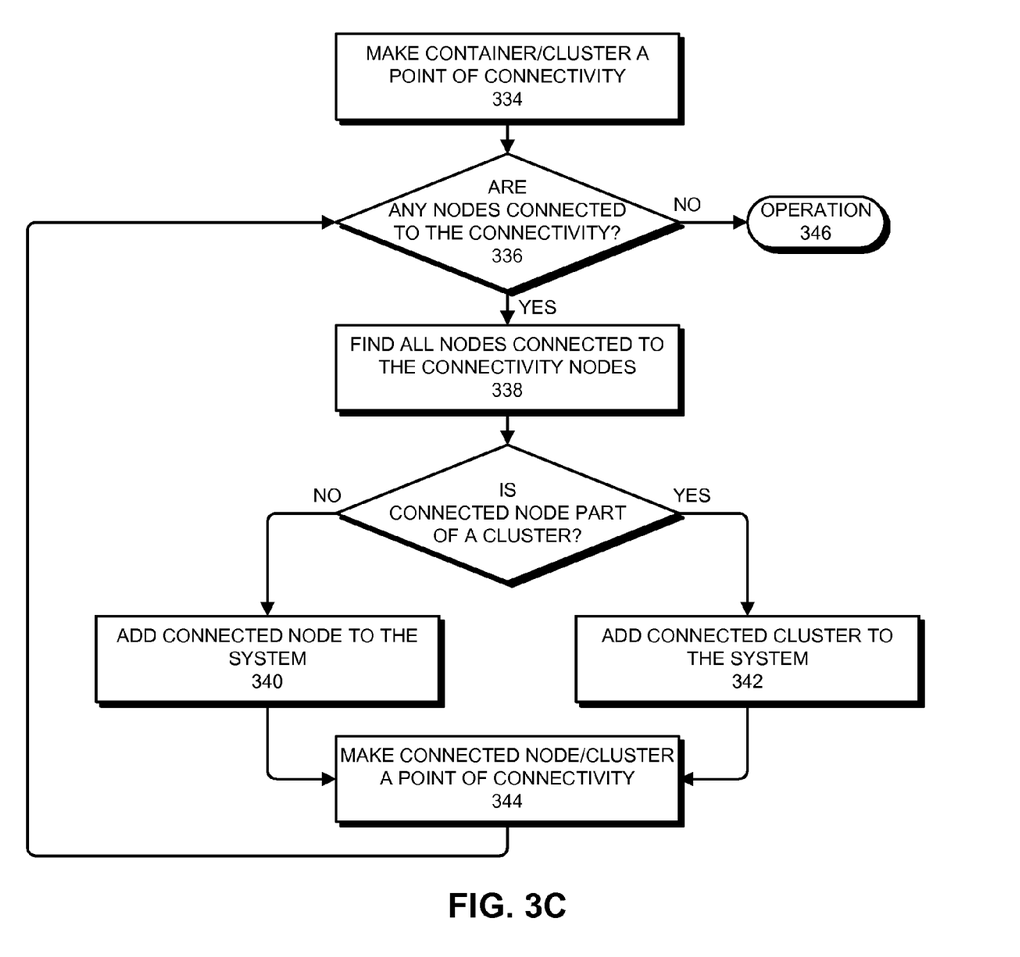
Figure 3D:
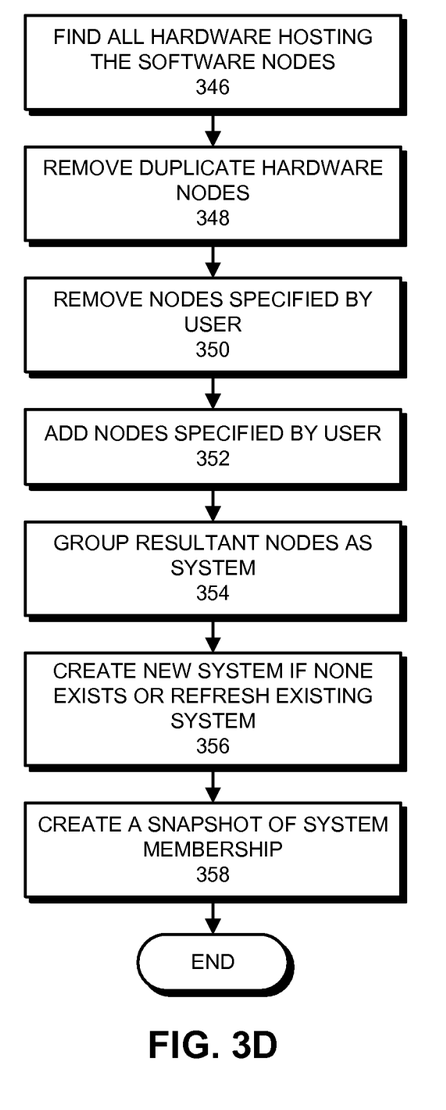
Figure 3E:
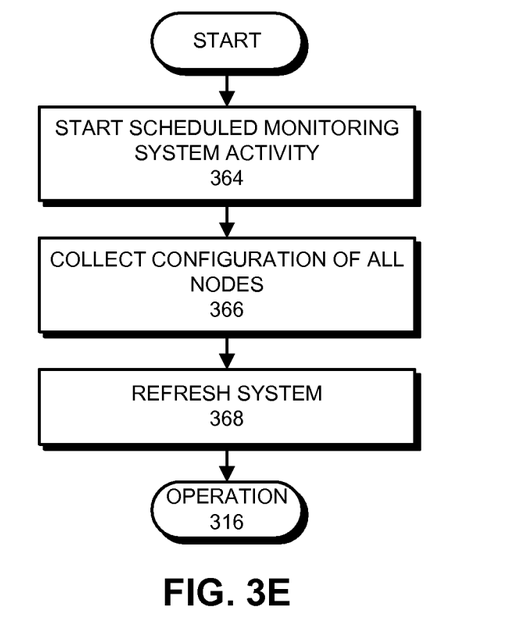

FIG. 2 illustrates an enterprise environment 200 in accordance with an embodiment of the present invention. Enterprise environment 200 comprises networks 160 and 202-204, web servers 212-216, application servers 222-226, databases 232-236, storage area network 240, and third-party services 250. Note that in some embodiments of the present invention, web servers 212-216 are member nodes of cluster 210, application servers 222-226 are member nodes of cluster 220, and databases 232-236 are member nodes of cluster 230. Any combination of clusters and stand-alone systems can be used with embodiments of the present invention. In some embodiments of the present invention, the system handles all monitoring for each mode in a cluster, while in other embodiments of the present invention, the system relies on pre-existing cluster-monitoring tools.

Enterprise Application Monitoring

FIGS. 3A-3E present flowcharts illustrating the process of creating and maintaining a monitor list in accordance with an embodiment of the present invention.

During operation, the monitoring system receives a request to creating a monitoring group and a service for an enterprise environment 200 (operation 302). Note that this request can come from a user or an administrator, such as user 120, or it can come from a monitoring system or service. Also note that, as described herein, the monitoring groups (enterprise application deployment systems) are referred to as "systems" and the deployed applications are referred to as "services". Additionally note that "monitoring system" refers to the framework provided by embodiments of the present invention.

Next, the monitoring system locates the existing system for the deployed container and/or cluster (operation 304). The monitoring system then determines if a service exists, and if so, a system also exists, so the monitoring system refreshes the system (operation 306) and continues at operation 368. If a service does not exist, the monitoring system determines if a system exists. If a system does exist, the monitoring system creates a new service (operation 308) and associates the service with the identified system (operation 310). If a system does not exist, the monitoring system creates a new system and a new service (operation 314). Note that this operation is described in more detail starting with operation 316.

When creating a new system or refreshing an existing system, the monitoring system starts by finding deployed containers (operation 316). The monitoring system then determines if the container is part of a cluster. If the container is not part of a cluster, the monitoring system makes the container a dependency root (operation 318). However, if the container is part of a cluster, the monitoring system makes the cluster a dependency root (operation 320). Next, the monitoring system adds the container or cluster to the system (operation 322). The monitoring system then finds all nodes that are part of a cluster (operation 324).

The monitoring system also finds all databases connected from the containers (operation 326), and determines if each database is part of a database cluster. If the database is not part of a database cluster, the monitoring system adds the database to the system (operation 328). However, if the database is part of a database cluster, the monitoring system adds the database cluster to the system (operation 330). Next, the monitoring system adds all of the storage devices of the database to the system (operation 332).

The monitoring system also makes all containers and clusters a point of connectivity (operation 334) so that the monitoring system can track down all connected hardware and software to add to the system. The monitoring system accomplishes this by determining if there are any nodes connected to each connectivity already discovered (operation 336). If not, the monitoring system continues to operation 346. However, if there are nodes connected to the connectivities, the monitoring system finds all nodes connected to the connectivity node (operation 338). The monitoring system also determines if each connected node is part of a cluster, and if not, the monitoring system adds the connected node to the system (operation 340). However, if so, the monitoring system adds the connected cluster to the system (operation 342). The monitoring system then makes each connected node or cluster a point of connectivity to facilitate discovery of additional connectivities (operation 344).

Once all of the connectivities have been discovered, the monitoring system finds all hardware hosting the software nodes (operation 346). Next, the monitoring system removes any duplicate hardware nodes (operation 348). Optionally, the monitoring system removes any nodes specified by user 120 (operation 350), and adds any nodes specified by user 120 (operation 352). Note that adding nodes specified by user 120 may include tracing all connectivities from the specified node. The monitoring system then groups all resultant nodes as a system (operation 354), creating a new system if none existed, or otherwise refreshing an existing system (operation 356). Finally, the monitoring system creates a snapshot of the system membership (operation 358).

During normal monitoring operations of the monitoring system, the monitoring system receives a request to initiate a scheduled monitoring system activity (operation 364). The monitoring system then collects the configuration of all nodes in the system (operation 366) and refreshes the system starting at operation 316 (operation 368).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically identifying components to monitor in an enterprise environment, the method comprising:

creating a system representing a monitoring group of
databases and servers that are in the enterprise environment and listed in a monitor list;
scanning the enterprise environment for a deployed container associated with a distributed enterprise application;
discovering a database of the enterprise application, wherein the database is associated with a container cluster to which the deployed container belongs;
determining a database cluster of the enterprise environment to which the database belongs;
determining servers that host the database cluster;
adding, to the monitor list, the servers and members of the database cluster;
monitoring the database cluster and servers in the monitor list; and
creating a snapshot of the created system, wherein the snapshot comprises collected configuration information of the created system.

2. The method of claim 1, further comprising:
retrieving the monitor list;
determining each database and each server hosting the enterprise application and the databases;
adding each database and each server not already on the monitor list to the monitor list;
removing each database and each server from the monitor list that is no longer a part of the enterprise application;
storing the monitor list; and
storing a change history of the monitor list.

3. The method of claim 1, further comprising:
retrieving the monitor list;
receiving a modification to the monitor list from a user;
applying the modification to the monitor list; and
storing the monitor list.

4. The method of claim 1, further comprising:
for each server, determining if the server is a member of a server cluster; and
if so, adding the server cluster to the monitor list.

5. The method of claim 1, further comprising:
for each server, determining if the server is a member of a server cluster; and
if so, adding the server cluster to the monitor list.

6. The method of claim 1, wherein scanning the enterprise application includes scanning an Object-Oriented Programming Language (OOPL) container.

7. The method of claim 1, further comprising periodically updating the monitor list to reflect changes to the enterprise environment.

8. The method of claim 1, further comprising:
receiving a command from a user to update the monitor list; and
in response to the command, updating the monitor list to reflect changes to the enterprise environment.

9. The method of claim 1, wherein the configuration information of the created system is collected based on deployment requirements of a respective piece of the created system, and wherein the snapshot facilitates monitoring the created system.

10. A non-transitory computer-readable storage medium storing instructions that when executed by a computer cause the computer to perform a method for automatically identifying components to monitor in an enterprise environment, the method comprising:
creating a system representing a monitoring group of databases and servers that are in the enterprise environment and listed in a monitor list;
scanning the enterprise environment for a deployed container associated with a distributed enterprise application;
discovering a database of the enterprise application, wherein the database is associated with a container cluster to which the deployed container belongs;
determining a database cluster of the enterprise environment to which the database belongs;
determining servers that host the database cluster;
adding, to the monitor list, the servers and members of the database cluster;
monitoring the database cluster and servers in the monitor list; and
creating a snapshot of the created system, wherein the snapshot comprises collected configuration information of the created system.

11. The computer-readable storage medium of claim 10, wherein the method further comprises:
retrieving the monitor list;
determining each database and each server hosting the enterprise application and the databases;
adding each database and each server not already on the monitor list to the monitor list;
removing each database and each server from the monitor list that is no longer a part of the enterprise application;
storing the monitor list; and
storing a change history of the monitor list.

12. The computer-readable storage medium of claim 10, wherein the method further comprises:
retrieving the monitor list;
receiving a modification to the monitor list from a user;
applying the modification to the monitor list; and
storing the monitor list.

13. The computer-readable storage medium of claim 10, wherein the method further comprises:
for each server, determining if the server is a member of a server cluster; and
if so, adding the hardware cluster to the monitor list.

14. The computer-readable storage medium of claim 10, wherein the method further comprises:
for each server, determining if the server is a member of a server cluster; and
if so, adding the hardware server to the monitor list.

15. The computer-readable storage medium of claim 10, wherein scanning the enterprise application includes scanning an Object-Oriented Programming Language (OOPL) container.

16. The computer-readable storage medium of claim 10, wherein the method further comprises periodically updating the monitor list to reflect changes to the enterprise environment.

17. The computer-readable storage medium of claim 10, wherein the collected configuration information of the created system is collected based on deployment requirements of a respective piece of the created system, and wherein the snapshot facilitates monitoring the created system.

18. An apparatus to automatically identify components to monitor in an enterprise environment, comprising:
a processor;
a storage device coupled to the processor and storing instructions that when executed by a computer cause the computer to perform a method, the method comprising:
creating a system representing a monitoring group of databases and servers that are in the enterprise environment and listed in a monitor list;

scanning the enterprise environment for a deployed container associated with a distributed enterprise application;

scanning the enterprise application for a database associated with a container cluster of which the deployed container is a member;

scanning the enterprise environment for servers hosting the container cluster and a database cluster of which the database is a member;

adding to the monitor list members of the database cluster, and to add to the monitor list servers hosting the database cluster; and creating a monitoring group so that the monitoring group includes databases and servers in the monitor list that are coupled to a user-specified node; and creating a snapshot of the created system, wherein the snapshot comprises collected configuration information of the created system.

\* \* \* \* \*

UNITED STATES PATENT AND TRADEMARK OFFICE
CERTIFICATE OF CORRECTION

| | |
|---|---|
| PATENT NO. | : 9,588,861 B2 |
| APPLICATION NO. | : 11/970930 |
| DATED | : March 7, 2017 |
| INVENTOR(S) | : Venkata Ramana Karpuram |

Page 1 of 1

It is certified that error appears in the above-identified patent and that said Letters Patent is hereby corrected as shown below:

In the Claims

Column 7, Line 43 please remove "cluster" hereinwith

Signed and Sealed this
Seventeenth Day of October, 2017

Joseph Matal
*Performing the Functions and Duties of the
Under Secretary of Commerce for Intellectual Property and
Director of the United States Patent and Trademark Office*